(Model.)
E. HOLLENBECK.
MEAT PRESERVING IMPLEMENT.
No. 374,600. Patented Dec. 13, 1887.
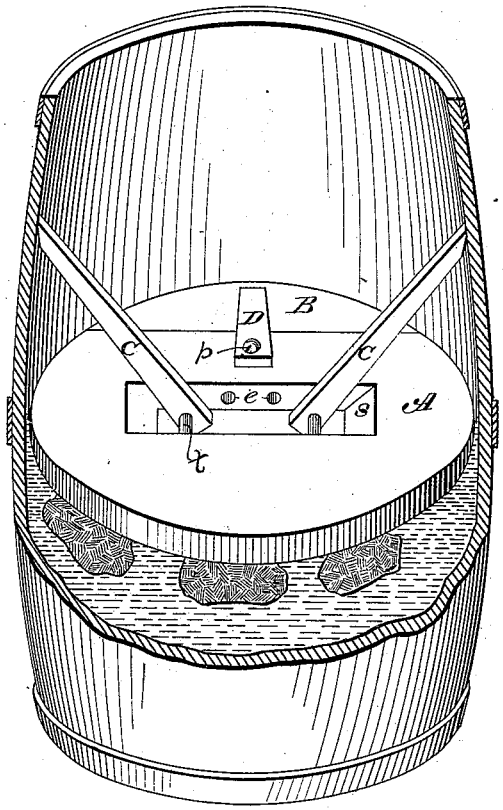
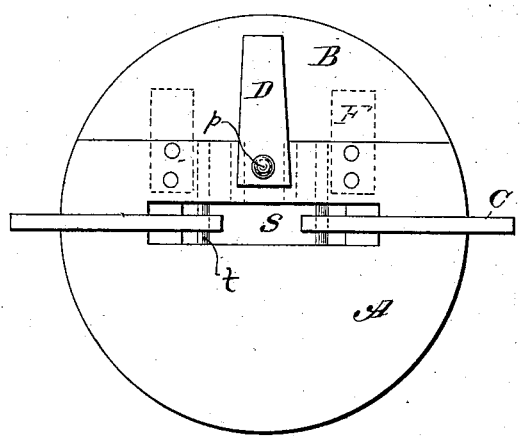
Witnesses:
Inventor:

UNITED STATES PATENT OFFICE.

ERNEST HOLLENBECK, OF DAVISON, MICHIGAN.

MEAT-PRESERVING IMPLEMENT.

SPECIFICATION forming part of Letters Patent No. 374,600, dated December 13, 1887.

Application filed September 22, 1887. Serial No. 250,452. (Model.)

*To all whom it may concern:*

Be it known that I, ERNEST HOLLENBECK, a citizen of the United States, residing at Davison, in the county of Genesee and State of Michigan, have invented a new and useful Meat-Preserving Implement, of which the following is a specification.

My invention relates to an improvement in meat-preserving implements, in which levers are substituted for weights; and the objects of my improvements are, first, to keep the meat, fish, or other food beneath the brine or other preserving-fluid by means of levers combined with a circular board in two pieces; second, to afford facilities for procuring meat or other foods, from beneath the fluid without removing the entire implement; third, to facilitate removal of the implement without lifting a heavy stone or other weight, as is now commonly practiced. I attain these objects by the mechanism illustrated in the accompanying drawings.

Figure 1 is a view of the entire machine. Fig. 2 is a plan view of the head.

The parts A and B form the head or follower, designed to fit the barrel or other vessel and afford the surface necessary to keep the meat or other food beneath the preserving-fluid. They should be made of wood or other suitable material and of a size, form, and thickness suited to the vessel in which they are to be used and purpose for which they are designed.

The levers C C work in the slot $s$ and hang on the pins, said pins being readily adjusted in different holes, thus giving a varying length to the levers $c$ $c$, adapting the machine to the varying size of the barrel or other vessel, $t$. The pins are inserted in holes at $e$ $e$ and are designed to support the levers, which, by bracing against each other and the opposite sides of the barrel, keep the head or follower firmly in a position to keep the meat or other food securely beneath the preserving-fluid. The pins also afford a convenient handle for lifting the machine from the barrel or other vessel.

The button D, fastened to and projecting from the upper part of the piece A, by a pin, $p$, and freely turning thereon, is designed to securely retain the piece B in position from above, and affords a ready means of removing the piece B as desired. The piece B is thus removably secured to the piece A. The cleats F F, fastened to and projecting from the under side of the piece A, are designed to retain the piece B in its proper place and prevent it sinking beneath the proper level. The parts being thus arranged, the parts A and B being together, form a circular head or follower, which is inserted into the top of a barrel ordinarily used for preserving meats in brine, the levers C C, hinged at their lower end upon a pivot, are placed against the inside of the barrel, and securely hold the follower or head against the solid contents in the barrel.

The part B is held in position from vertical displacement by the cleats F on the under side of the part A and by the button D on the upper side of the part A. To remove a part of the contents of the barrel or receptacle the button D may be turned from off the part B, which may then be lifted out of the barrel without interfering with the other parts, and the meats may be taken through the aperture thus left, the part B replaced, and secured in position by the button.

What I claim as my invention, and desire to secure by Letters Patent, is—

1. In a follower-head for preserving-vessels, the combination of a head divided in two parts, one part carrying the levers C and the other part being removably secured thereto, substantially as described.

2. In a follower-head for preserving-vessels, the part A, having the levers C, the cleats F, and the turn-button D, secured thereto, and the part B, held between said cleats and turn-button, substantially as described.

ERNEST HOLLENBECK.

Witnesses:
M. C. HUTCHINS,
J. F. CARTWRIGHT.